(12) United States Patent
Ohsawa (10) Patent No.: US 6,980,231 B1
(45) Date of Patent: Dec. 27, 2005

(54) COLOR REPRODUCTION SYSTEM

(75) Inventor: Kenro Ohsawa, Musashino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/577,445

(22) Filed: May 24, 2000

(30) Foreign Application Priority Data

May 25, 1999 (JP) ................................. 11-144932

(51) Int. Cl.[7] .......................................... H04N 17/02
(52) U.S. Cl. ..................... 348/188; 348/179; 348/187; 348/222.1; 348/223.1; 358/518; 358/519; 382/167
(58) Field of Search ............................. 348/262, 222.1, 348/223.1, 187, 188, 254, 256, 272, 273, 348/162, 167, 179; 358/518, 519

(56) References Cited

U.S. PATENT DOCUMENTS

| | | | | |
|---|---|---|---|---|
| 4,991,007 A | * | 2/1991 | Corley | 348/188 |
| 5,311,293 A | * | 5/1994 | MacFarlane et al. | 356/421 |
| 5,363,318 A | * | 11/1994 | McCauley | 702/85 |
| 5,668,596 A | * | 9/1997 | Vogel | 348/222.1 |
| 5,793,884 A | * | 8/1998 | Farrell | 382/167 |
| 6,414,756 B1 | * | 7/2002 | Tsukada | 358/1.9 |
| 6,453,066 B1 | * | 9/2002 | Shiraiwa et al. | 382/162 |
| 6,466,334 B1 | * | 10/2002 | Komiya et al. | 358/1.9 |
| 6,549,653 B1 | * | 4/2003 | Osawa et al. | 382/162 |
| 6,654,493 B1 | * | 11/2003 | Hilliard et al. | 382/167 |

* cited by examiner

Primary Examiner—Thai Tran
Assistant Examiner—Chriss S. Yoder
(74) Attorney, Agent, or Firm—Straub & Pokotylo; John C. Pokotylo (57) ABSTRACT

A color reproduction system includes a tristimulus value calculation unit for calculating tristimulus values (X, Y, Z) under observation illumination light corresponding to the spectral reflectance of an object, which is obtained by a spectral reflectance calculation unit, and a color image signal calculation unit for calculating output color image signals (R', G', B') to a CRT monitor on the basis of the tristimulus values (X, Y, Z). The tristimulus value calculation unit converts spectral reflectance image data (F) of the object into tristimulus value image data (X, Y, Z) under the observation illumination light using the spectral reflectance data of a color chip formed from a plurality of unit color chips, color chip image data (P') obtained by sensing the color chip with a digital camera under the observation illumination light, spectral sensitivity data of the digital camera, and color matching function data.

14 Claims, 3 Drawing Sheets

COLOR REPRODUCTION SYSTEM

CROSS-REFERENCE TO RELATED APPLICATIONS

This application is based upon and claims the benefit of priority from the prior Japanese Patent Application No. 11-144932, filed May 25, 1999, the entire contents of which are incorporated herein by reference.

BACKGROUND OF THE INVENTION

The present invention relates to a reproduction system having a color image processing apparatus for calculating tristimulus values under observation illumination light corresponding to the spectral reflectance of an object.

In recent years, color management systems (CMS) for matching the colors of input/output images between a plurality of color image devices such as a color CRT monitor and color printer are becoming popular in various fields handling color images.

In a CMS, a problem is arisen in accurately reproducing colors to be perceived when sensing illumination light in sensing an object is different from observation illumination light in observing an image obtained by displaying image data obtained by sensing on a CRT monitor or outputting it by a printer because the colors of the observed image are different between these environments due to the change in human visual characteristics.

As a solution to this problem, a color reproduction method is employed in which the spectral reflectance $f(\lambda)$ of the object is obtained, and CIE XYZ values of the reflectance spectrum are calculated by multiplying the spectral reflectance by the spectrum $E_o(\lambda)$ of observation illumination light for display.

The spectral reflectance $f(\lambda)$ is obtained in correspondence with each pixel of the object image obtained by sensing the object. The CIE XYZ values are calculated by equations (1) using XYZ color matching functions $x(\lambda)$, $y(\lambda)$, and $z(\lambda)$ defined by the International Commission on Illumination (CIE).

$$X = \int_{\lambda=380}^{780} x(\lambda) E_o(\lambda) f(\lambda) d\lambda$$

$$Y = \int_{\lambda=380}^{780} y(\lambda) E_o(\lambda) f(\lambda) d\lambda$$

$$Z = \int_{\lambda=380}^{780} z(\lambda) E_o(\lambda) f(\lambda) d\lambda$$

where $\lambda$ is the wavelength [nm]. In this method of obtaining the spectral reflectance $f(\lambda)$ corresponding to each pixel of the object image and calculating the XYZ values under the observation illumination light on the basis of the spectral reflectance for display, the XYZ values when the object is present under the observation illumination light are displayed. For this reason, accurate colors to be perceived can be reproduced without using a visual model for chromatic adaptation.

In the above-described conventional color reproduction system, to calculate the XYZ values under the observation illumination light from the spectral reflectance $f(\lambda)$ of the object, the spectrum $E_o(\lambda)$ of the observation illumination light must be obtained.

However, to accurately measure the spectrum, a measurement instrument such as a spectrophotometer is necessary. Since spectrophotometers must be prepared at various observation positions to measure the spectrum of the observation illumination light $E_o(\lambda)$, resulting in cumbersomeness.

BRIEF SUMMARY OF THE INVENTION

It is an object of the present invention to provide a color reproduction system having a color image processing apparatus for calculating tristimulus values under observation illumination light corresponding to the spectral reflectance of an object without using any measurement instrument such as a spectrophotometer, unlike the prior art.

In order to solve the above problem, as a characteristic feature of the present invention, in a color reproduction system comprising tristimulus value calculation means for calculating tristimulus values under observation illumination light corresponding to a spectral reflectance of an object, color image signal calculation means for calculating an output color image signal on the basis of the tristimulus values, and color image output means for outputting a color image upon receiving the output color image signal, the tristimulus value calculation means calculates the tristimulus values using spectral reflectance data of a color chip formed from a plurality of unit color chips, color chip sensing data obtained by sensing the color chip with an input device under the observation illumination light, spectral sensitivity data of the input device, and color matching function data.

In the present invention having this arrangement, the tristimulus values under the observation illumination light corresponding to the spectral reflectance of the object can be obtained using a color chip having a known spectral reflectance and an input device for sensing the color chip, which has a known spectral sensitivity. That is, the spectral reflectance image data can be converted into XYZ image data as tristimulus values under the observation illumination light without using any measurement instrument such as a spectrophotometer.

As a characteristic feature of an aspect, the tristimulus value calculation means multiplies the color chip sensing data by a matrix obtained from the relationship between the product of the spectral reflectance of the object and the color matching functions and the product of the spectral reflectance of the color chip and the spectral sensitivity of the input device, thereby calculating the tristimulus values.

When the product of the spectral reflectance of the object and the color matching functions can be expanded by the product of the spectral reflectance of the color chip and the spectral sensitivity of the input device for sensing the color chip, spectral reflectance image data can be highly accurately converted into XYZ image data as the tristimulus values under the observation illumination light.

Even when such expansion is impossible, highly accurate conversion can be performed by increasing the expansion accuracy by changing the color chip to be used and the characteristics of the input device for sensing the color chip in accordance with the spectral reflectance of the object.

As a characteristic feature of another aspect, the tristimulus value calculation means obtains the tristimulus values as the linear sum of basis function tristimulus values obtained by multiplying the color chip sensing data by a matrix obtained from the relationship between the product of the plurality of basis functions of the spectral reflectance of the object and the color matching functions and the product of the spectral reflectance of the color chip and the spectral sensitivity of the input device.

When the product of the plurality of basis functions of the spectral reflectance of the object and the color matching functions can be expanded by the product of the spectral reflectance of the color chip and the spectral sensitivity of the input device for sensing the color chip, spectral reflectance image data can be highly accurately converted into XYZ image data as the tristimulus values under the observation illumination light.

Even when such expansion is impossible, highly accurate conversion can be performed by increasing the expansion accuracy by changing the color chip to be used and the characteristics of the input device for sensing the color chip in accordance with the basis function of the spectral reflectance of the object. When all spectral reflectances of the object are expanded by the basis functions, the conversion accuracy for the actual object can be obtained in advance by evaluating the conversion accuracy for the basis function in advance.

In addition, the tristimulus values under the observation illumination light corresponding to the basis function of the spectral reflectance of the object can be calculated in advance. For this reason, after the expansion coefficient corresponding to the spectral reflectance of the object is input, the tristimulus values under the observation illumination light corresponding to the spectral reflectance of the object can be calculated at a high speed as the linear sum of the tristimulus values of the basis functions.

More specifically, according to the first aspect of the present invention, there is provided a color reproduction system comprising:

tristimulus value calculation means for calculating tristimulus values under observation illumination light corresponding to a spectral reflectance of an object, the tristimulus value calculation means calculating the tristimulus values using spectral reflectance data of a color chip formed from a plurality of unit color chips, color chip sensing data obtained by sensing the color chip with an input device under the observation illumination light, spectral sensitivity data of the input device, and color matching function data;

means for calculating an output color image signal on the basis of the calculated tristimulus values; and means for outputting a color image on the basis of the output color image signal.

According to the second aspect of the present invention, there is provided a color reproduction system comprising:

first image sensing means for sensing an object under sensing illumination light;

means for calculating a spectral reflectance of image data of the object sensed by the first image sensing means on the basis of spectral sensitivity data of the first image sensing means, spectrum data of the sensing illumination light, statistic data of a spectra reflectance of the object, and color matching function data, and outputting spectral reflectance image data corresponding to the calculated spectral reflectance;

second image sensing means for sensing a color chip under observation illumination light;

means for calculating tristimulus values of the object under the observation illumination light on the basis of the output spectral reflectance image data, color chip image data of the color chip sensed by the second image sensing means, spectral sensitivity data of the second image sensing means, color chip spectral reflectance data representing a spectral reflectance of the color chip, and color matching function data;

means for calculating an output color image signal on the basis of the calculated tristimulus values; and means for outputting a color image on the basis of the output color image signal.

According to the third aspect of the present invention, there is provided a color reproduction system comprising:

first image sensing means for sensing an object under sensing illumination light;

means for outputting expansion coefficient data representing a linear sum of basis functions of a spectral reflectance of the object on the basis of spectral sensitivity data of the first image sensing means, spectrum data of the sensing illumination light, statistic data of a spectral reflectance of the object, and color matching function data;

second image sensing means for sensing a color chip under observation illumination light;

means for calculating tristimulus values of the object under the observation illumination light on the basis of the output expansion coefficient data, color chip image data of the color chip sensed by the second image sensing means, spectral sensitivity data of the second image sensing means, color chip spectral reflectance data representing a spectral reflectance of the color chip, and color matching function data;

means for calculating an output color image signal on the basis of the calculated tristimulus values; and means for outputting a color image on the basis of the output color image signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described below with reference to the accompanying drawing.

FIRST EMBODIMENT

Figure 1:
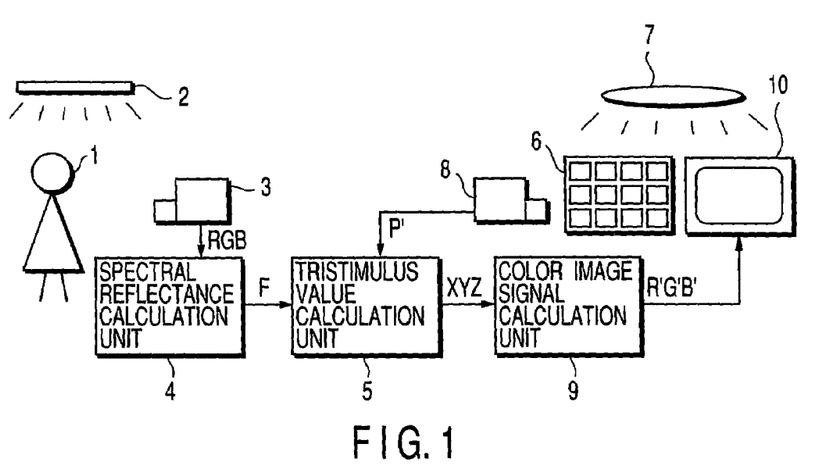
FIG. 1 is a block diagram showing the arrangement of a color reproduction system according to the first embodiment of the present invention.

FIG. 1 shows a color reproduction system according to the first embodiment of the present invention.

When an object 1 is sensed by a first digital camera 3 under sensing illumination light by sensing illumination 2, an object image signal is output from the digital camera 3 as RGB image data. This RGB image data is input to a spectral reflectance calculation unit 4.

Upon receiving the RGB image data from the digital camera 3, the spectral reflectance calculation unit 4 calculates, as a spectral reflectance f(λ) corresponding to each pixel of the RGB image data, the spectral reflectance f(λ) of the object 1 using the spectral sensitivity data of the digital camera 3, spectrum data of the sensing illumination light, statistic data of the object spectral reflectance, and color matching function data.

Image data (called spectral reflectance image data) F corresponding to the calculated distribution of the spectral reflectance f(λ) is output. The spectral reflectance image data F is input to a tristimulus value calculation unit 5.

When a color chip 6 is sensed by a second digital camera 8 as an input device under observation illumination light by observation illumination 7, color chip image data P' corresponding to the color chip 6 is output from the digital camera 8.

The color chip 6 is formed by arraying a plurality of (M) unit color chips having independent spectral reflectances in a matrix. The color chip 6 is laid out without any illumination variation and sensed by the digital camera 8. The color chip image data P' is input to the tristimulus value calculation unit 5.

The tristimulus value calculation unit 5 calculates tristimulus values X, Y, and Z corresponding to the spectral reflectance of the object 1 under the observation illumination light from the spectral reflectance image data F input from the spectral reflectance calculation unit 4, the color chip image data P' input from the second digital camera 8, the spectral sensitivity data of the digital camera 8, the color chip spectral reflectance data representing the spectral reflectance distribution of the color chip 6, and color matching function data, and outputs XYZ image data.

The XYZ image data are input to a color image signal calculation unit 9. The spectral sensitivity of the digital camera 8, the color chip spectral reflectance, and color matching functions have known values and stored and held in the tristimulus value calculation unit 5 in advance.

The color image signal calculation unit 9 converts the XYZ image data input from the tristimulus value calculation unit 5 into output color image signals R', G', and B' using a monitor profile as input/output characteristic information of a CRT monitor 10, which is obtained in advance by measurement.

The output color image signals R', G', and B' are input to the CRT monitor 10 as a color image output means whereby an object image having the colors of the object 1 under the observation illumination light is displayed on the CRT monitor 10.

The detailed arrangement and processing of each section shown in FIG. 1 will be described next in detail.

Figure 2:
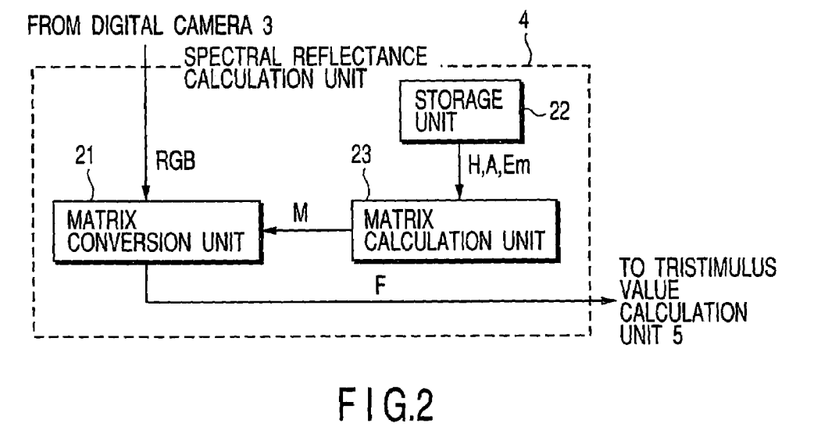
FIG. 2 is a block diagram showing the arrangement of a spectral reflectance calculation unit of the first embodiment.

FIG. 2 shows the arrangement of the spectral reflectance calculation unit 4.

The spectral reflectance calculation unit 4 comprises a matrix conversion unit 21, storage unit 22, and matrix calculation unit 23.

The RGB image data from the first digital camera 3 is input to the matrix conversion unit 21. The matrix conversion unit 21 outputs the spectral reflectance image data F by multiplying the RGB image data by a matrix calculated by the matrix calculation unit 23 on the basis of data stored in the storage unit 22.

The spectral reflectance calculation unit. 4 shown in FIG. 2 will be described in more detail. The storage unit 22 stores and holds spectral sensitivity data H of the first digital camera 3, sensing illumination light spectrum data Em, and correlation matrix data A of the spectral reflectance of the object 1 as data at a 1-nm interval in the wavelength range of 380 to 780 nm.

The sensing illumination light spectrum data Em is measured using a spectrophotometer or set in advance. The correlation matrix data A of the spectral reflectance of the object 1 is also calculated from data measured in advance.

The matrix calculation unit 23 reads out the data H, A, and Em from the storage unit 22 and calculates a spectral reflectance estimation matrix M for converting the RGB image data from the digital camera 3 into the spectral reflectance image data F.

The spectral reflectance estimation matrix M is a 401×3 matrix which is used to convert the RGB image data as three-dimensional data into a 401-dimensional spectral reflectance at the 1-nm interval in the wavelength range of 380 to 780 nm. Let G be the RGB image data output from the digital camera 3.

$$\text{Error} = \langle (K - MG)^t(K - MG) \rangle$$

$$= \langle (K - MHE_mF)^t(K - MHE_mF) \rangle$$

$$= \langle (K - MHE_mVK)^t(K - MHE_mVK) \rangle$$

for $$H = \begin{pmatrix} r(380), r(381), \ldots, r(780) \\ g(380), g(381), \ldots, g(780) \\ b(380), b(381), \ldots, b(780) \end{pmatrix}$$

$$Em = \begin{pmatrix} E_m(380), 0, \ldots, 0 \\ 0, E_m(381), \ldots, 0 \\ \ldots \\ 0, 0, \ldots, E_m(780) \end{pmatrix}$$

$$F = (f(380), f(381), \ldots, f(780))^t$$

$$M = \begin{pmatrix} m_{11} & m_{12} & m_{13} \\ m_{21} & m_{22} & m_{23} \\ & \vdots & \\ m_{4011} & m_{4012} & m_{4013} \end{pmatrix}$$

M that minimizes the above matrix is given by $$M = A(HEm)^t(HEmA(HEm)^t)^{-1}$$

for $$A = \langle FF^t \rangle$$

The matrix conversion unit 21 multiplies the RGB image data G by the spectral reflectance estimation matrix M and outputs the spectral reflectance image data F.

Figure 3:
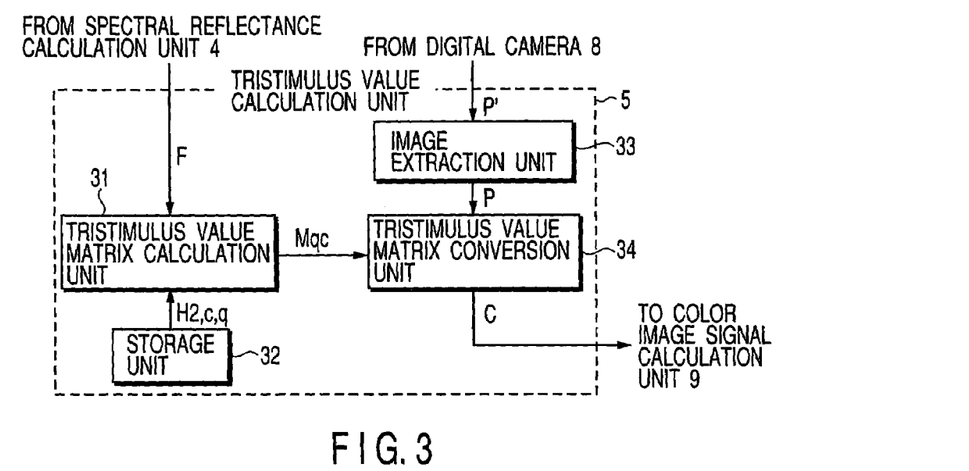
FIG. 3 is a block diagram showing the arrangement of a tristimulus value calculation unit of the first embodiment.

FIG. 3 shows the arrangement of the tristimulus value calculation unit 5.

The tristimulus value calculation unit 5 comprises a tristimulus value matrix calculation unit 31, storage unit 32, image extraction unit 33, and tristimulus value matrix conversion unit 34.

The spectral reflectance image data F output from the spectral reflectance calculation unit 4 shown in FIG. 1 or 2 is input to the tristimulus value matrix calculation unit 31. A tristimulus value matrix Mqc is calculated on the basis of data stored in the storage unit 32.

The tristimulus value matrix Mqc is input to the tristimulus value matrix conversion unit 34. The tristimulus value matrix conversion unit 34 multiplies the tristimulus value matrix Mqc by color chip sensing data P extracted by the image extraction unit 33 to perform matrix conversion, thereby obtaining tristimulus values C.

The tristimulus value calculation unit 5 shown in FIG. 3 will be described in more detail. The storage unit 32 stores and holds spectral sensitivity data H2 of the second digital camera 8, color matching function data c, and spectral reflectance data q of the color chip 6 as data at a 1-nm interval in the wavelength range of 380 to 780 nm.

The tristimulus value matrix calculation unit 31 reads out the data H2, c, and q from the storage unit 32 and calculates the tristimulus value estimation matrix Mqc for converting the color chip sensing data input from the second digital camera 8 through the image extraction unit 33 into the tristimulus values C under the observation illumination light spectrum of the spectral reflectance image data F read from the spectral reflectance calculation unit 4.

The image extraction unit 33 extracts data in each unit color chip region from the color chip image data P1 obtained by sensing the color chip 6 with the second digital camera 8 and calculates the average signal value thereof to obtain the color chip sensing data P.

The color chip 6 is constructed by a plurality of (M) unit color chips having independent spectral reflectances. Hence, 3M color chip sensing data P are obtained by sensing the M unit color chips with the digital camera 8 using three RGB channels and extracting the data by the image extraction unit 33.

The tristimulus value estimation matrix Mqc is a 3×3M matrix which is used to convert the 3M color chip sensing data P obtained by the three RGB channels into the tristimulus values C as three-dimensional XYZ image data.

The tristimulus value estimation matrix Mqc is calculated in the following manner. Let $hi^{(2)}(\lambda)$ (i=1 to 3) be the spectral sensitivity data H2 of the second digital camera 8, $qj(\lambda)$ (j=1 to M) be the spectral reflectance data q of the color chip 6, and $ci(\lambda)$ (i=1 to 3) be the color matching function data c.

$$f_i'(\lambda) = c_i(\lambda)f(\lambda) \quad (i=1\sim3)$$

$$q'_M(i-1)+j(\lambda) = h_i^{(2)}(\lambda)q_j(\lambda) \quad (i=1\sim3, j=1\sim M)$$

$$f' = (f_1', f_2', f_3')^t$$

$$f_i' = (f_i'(\lambda_1), f_i'(\lambda_2), \ldots, f_i'(\lambda_N))$$

$$q' = (q_1', q_2', \ldots, q_{3M}')^t$$

$$q_i' = (q_i'(\lambda_1), q_i'(\lambda_2), \ldots, q_i'(\lambda_N))$$

Mqc that minimizes $$E_{qc} = (f' - M_{qc}q')^t(f' - M_{qc}q')$$

is calculated by $$M_{qc} = f'q'^t(q'q'^t)^{-1}$$

More specifically, the tristimulus value estimation matrix Mqc is obtained from the relationship between the product of the spectral reflectance $f(\lambda)$ of the object 1 and the color matching functions $ci(\lambda)$ and the product of the spectral reflectance $qj(\lambda)$ of the color chip 6 and the spectral sensitivity $hi^{(2)}(\lambda)$ of the digital camera 8 as an input device for sensing the color chip 6.

The calculated tristimulus value estimation matrix Mqc is input to the tristimulus value matrix conversion unit 34, so the tristimulus values C are calculated by $$C = M_{qc}P$$

$$P = (p_1, p_2, \ldots, p_{3M})^t$$

$$C = (X, Y, Z)^t$$

As is apparent from equations (8), when Eqc is 0, accurate tristimulus values C can be obtained by the above equations for an arbitrary observation illumination light spectrum Eo. The tristimulus values C calculated by the tristimulus value matrix conversion unit 34 are input to the color image signal calculation unit 9 shown in FIG. 1.

Figure 4:
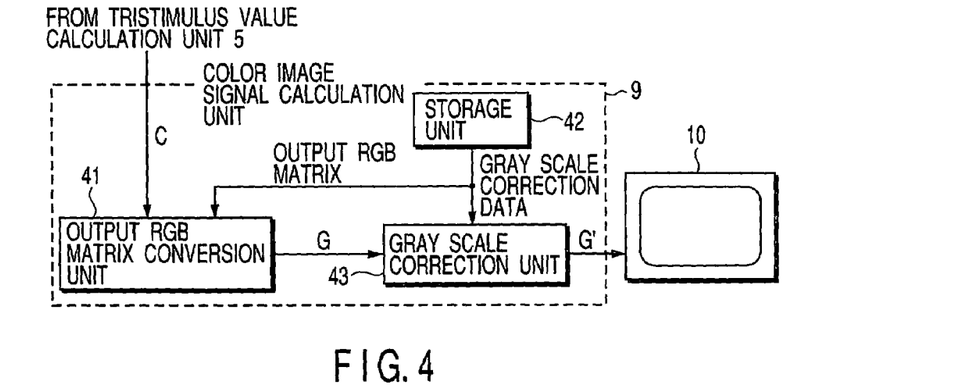
FIG. 4 is a block diagram showing the arrangement of a color image signal calculation unit of the first embodiment.

FIG. 4 shows the arrangement of the color image signal calculation unit 9.

The color image signal calculation unit 9 comprises an output RGB matrix conversion unit 41, storage unit 42, and gray scale correction unit 43.

The tristimulus values C output from the tristimulus value matrix conversion unit 34 in the tristimulus value calculation unit 5 shown in FIG. 3 are input to the color image signal calculation unit 9. In the output RGB matrix conversion unit 41, the tristimulus values C are converted into the RGB data G by equations (9) in accordance with an output RGB matrix Mcm given by the storage unit 42.

$$G = M_{cm}C$$

for $$G = (R, G, B)^t$$

$$M_{cm} = \begin{pmatrix} X_r X_g X_b \\ Y_r Y_g Y_b \\ Z_r Z_g Z_b \end{pmatrix}^{-1}$$

where Xr, Xg, and Xb are X values for R, G, and B maximum light emission. This also applies to Y and Z values.

The RGB data G calculated by the output RGB matrix conversion unit 41 are input to the gray scale correction unit 43, and nonlinear gray scale correction is performed in accordance with gray scale correction data given by the storage unit 42.

RGB data G' (corresponding to R', G', and B' in FIG. 1) after gray scale correction are input to the CRT monitor 10 as output color image signals, and the color image of the object 1 is displayed on the CRT monitor 10.

As described above, according to the first embodiment, by using the color chip 6 having a known spectral reflectance and the digital camera 8 as an input device for sensing the color chip 6, which has a known spectral sensitivity, the spectral reflectance image data F can be converted into XYZ image data as the tristimulus values C under the observation illumination light by the tristimulus value calculation unit 5 without using any measurement instrument such as a spectrophotometer.

If the product of the spectral reflectance $f(\lambda)$ of the object 1 and the color matching functions $ci(\lambda)$ can be expanded by the product of the spectral reflectance $qj(\lambda)$ of the color chip 6 and the spectral sensitivity $hi^{(2)}(\lambda)$ of the digital camera 8 as an input device for sensing the color chip 6, the spectral reflectance image data F can be highly accurately converted into the XYZ image data as the tristimulus values C under the observation illumination light.

In this embodiment, more accurate conversion is enabled by changing the color chip 6 to be used and the characteristics of the second digital camera 8 as an input device for sensing the color chip 6 in accordance with the spectral reflectance $f(\lambda)$ of the object 1.

SECOND EMBODIMENT

Figure 5:
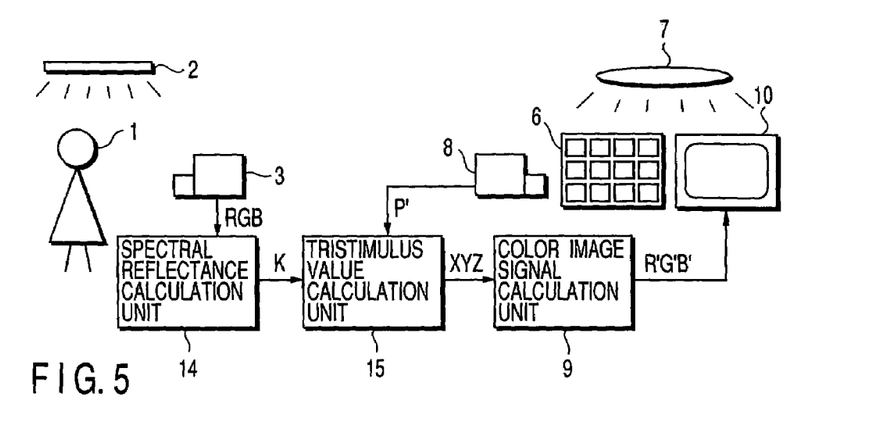
FIG. 5 is a block diagram showing the arrangement of a color reproduction system according to the second embodiment of the present invention.

FIG. 5 shows a color reproduction system according to the second embodiment of the present invention.

In this embodiment, the output from a spectral reflectance calculation unit 14 becomes the expansion coefficient when the spectral reflectance of an object 1 is represented as the linear sum of basis functions. The arrangement of this embodiment is the same as that described in the first embodiment except the spectral reflectance calculation unit 14 and tristimulus value calculation unit 15, and a detailed description thereof will be omitted.

The spectral reflectance calculation unit 14 receives RGB image data from a digital camera 3 and outputs expansion coefficient data K when the spectral reflectance of the object 1 is represented by the linear sum of basis functions by using the spectral sensitivity data of the digital camera 3, spectrum data of sensing illumination light, and statistic data of the spectral reflection of the object 1.

The expansion coefficient data K is input to the tristimulus value calculation unit 15. The tristimulus value calculation unit 15 also receives color chip image data P' corresponding to a color chip 6, which is output from a second digital camera 8 as an input device which senses the color chip 6 formed from a plurality of unit color chips under observation illumination light by observation illumination 7.

On the basis of the expansion coefficient data K input from the spectral reflectance calculation unit 14, the color chip image data P' output from the second digital camera 8, the spectral sensitivity data of the digital camera 8, the spectral reflectance data of the color chip 6, and the color matching function data, the tristimulus value calculation unit 15 calculates tristimulus values X, Y, and Z corresponding to the spectral reflectance of the object 1 under the observation illumination light and inputs the XYZ image data to a color image signal calculation unit 9.

The spectral sensitivity of the digital camera 8, the color chip spectral reflectance, and color matching functions have known values, and these data are stored and held in the tristimulus value calculation unit 15 in advance.

Figure 6:
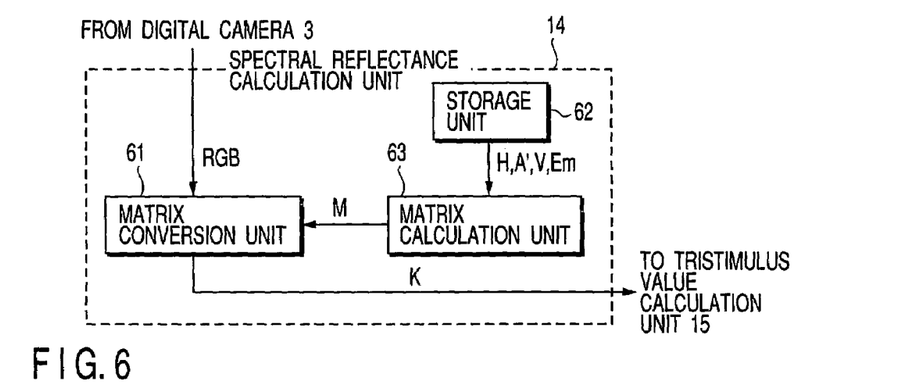
FIG. 6 is a block diagram showing the arrangement of a spectral reflectance calculation unit of the second embodiment.

FIG. 6 shows the arrangement of the spectral reflectance calculation unit 14. The spectral reflectance calculation unit 14 comprises a matrix conversion unit 61, storage unit 62, and matrix calculation unit 63.

The RGB image data from the first digital camera 3 are input to the matrix conversion unit 61. The RGB data are multiplied by a matrix calculated by the matrix calculation unit 63 on the basis of data stored in the storage unit 62, so the expansion coefficient data K of the spectral reflectance is output.

The storage unit 62 stores and holds spectral sensitivity data H of the first digital camera 3, correlation matrix data A' of the expansion coefficient when the spectral reflectance of the object 1 is represented as the linear sum of basis functions, basis function data V of the spectral reflectance of the object 1, and sensing illumination light spectrum data Em as data at a 1-nm interval in the wavelength range of 380 to 780 nm.

The matrix calculation unit 63 reads out the data H, A', V, and Em from the storage unit 62 and calculates a expansion coefficient estimation matrix M for converting the RGB image data from the digital camera 3 into the expansion coefficient data K of the object spectral reflectance.

The expansion coefficient estimation matrix M is an R×3 matrix which is used to convert the three-dimensional RGB data into a expansion coefficient related to R basis functions. Let G be the RGB image data from the digital camera 3.

for $$H = \begin{pmatrix} r(380), r(381), \ldots, r(780) \\ g(380), g(381), \ldots, g(780) \\ b(380), b(381), \ldots, b(780) \end{pmatrix}$$

$$Em = \begin{pmatrix} E_m(380), 0, \ldots, 0 \\ 0, E_m(381), \ldots, 0 \\ \ldots \\ 0, 0, \ldots, E_m(780) \end{pmatrix}$$

$$v = \begin{pmatrix} v_1(380)v_2(380) \ldots v_R(380) \\ v_1(381)v_2(381) \ldots v_R(381) \\ v_1(780)v_2(780) \ldots v_R(780) \end{pmatrix}$$

$$K = (k_1, k_2, \ldots, k_R)^t$$

$$M = \begin{pmatrix} m_{11} & m_{12} & m_{13} \\ m_{21} & m_{22} & m_{23} \\ & \vdots & \\ m_{R1} & m_{R2} & m_{R3} \end{pmatrix}$$

M that minimizes the above matrix is given by $$M = \langle K^t K \rangle (HEmV)^t (HEmV^t \langle K^t K \rangle (HEmV)^t)^{-1}$$

The matrix conversion unit 61 multiplies the RGB image data G by the calculated expansion coefficient estimation matrix M, thereby outputting the expansion coefficient data K.

Figure 7:
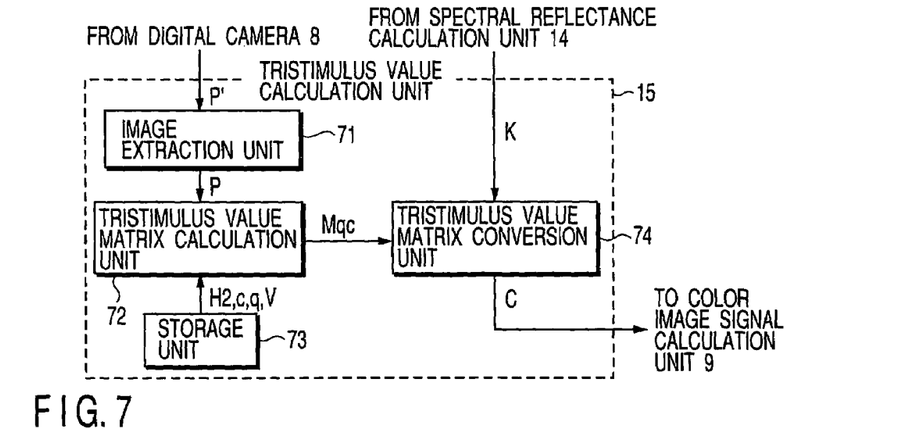
FIG. 7 is a block diagram showing the arrangement of a tristimulus value calculation unit of the second embodiment.

FIG. 7 shows the arrangement of the tristimulus value calculation unit 15. The tristimulus value calculation unit 15 comprises an image extraction unit 71, tristimulus value matrix calculation unit 72, storage unit 73, and tristimulus value matrix conversion unit 74.

The color chip image data P' obtained by sensing the color chip 6 with the digital camera 8 is input to the tristimulus value matrix calculation unit 72 through the image extraction unit 71. A tristimulus value estimation matrix Mqc is calculated on the basis of data stored in the storage unit 73.

The tristimulus value estimation matrix Mqc is input to the tristimulus value matrix conversion unit 74. In the tristimulus value matrix conversion unit 74, the tristimulus value estimation matrix Mqc is multiplied by the expansion coefficient data K of the spectral reflectance of the object 1, which is output from the spectral reflectance calculation unit 14, thereby obtaining tristimulus values C.

Each section shown in FIG. 7 will be described in more detail. The storage unit 73 stores and holds spectral sensitivity H2 of the second digital camera 8, color matching function data c, spectral reflectance data g of the color chip 6, and basis function data V of the object spectral reflectance as data at a 1-nm interval in the wavelength range of 380 to 780 nm.

The tristimulus value matrix calculation unit 72 reads out the data H2, c, q, and V from the storage unit 73 and calculates the tristimulus value estimation matrix Mqc for converting color chip sensing data P input from the second digital camera 8 through the image extraction unit 71 into the tristimulus values C under the observation illumination light of the spectral reflectance corresponding to the expansion coefficient of the expansion coefficient data K read from the spectral reflectance calculation unit 14.

The image extraction unit 71 extracts data in each unit color chip region from the color chip image data P' obtained by sensing the color chip 6 with the second digital camera 8 and calculates the average signal value, thereby obtaining the color chip sensing data P.

The color chip 6 is constructed by a plurality of (M) unit color chips having independent spectral reflectances. Hence, 3M color chip sensing data P are obtained by sensing the M unit color chips with the digital camera 8 using three RGB channels and extracting the data by the image extraction unit 71.

The tristimulus value estimation matrix Mqc is a 3×R matrix which is used to convert the R expansion coefficient data K into the tristimulus values C as three-dimensional XYZ image data. The tristimulus value estimation matrix Mqc is calculated in the following manner. Let $hi^{(2)}(\lambda)$ (i=1 to 3) be the spectral sensitivity data H2 of the digital camera 8 as an input device, $qj(\lambda)$ (j=1 to M) be the spectral reflectance data q of the color chip 6, $ci(\lambda)$ (i=1 to 3) be the color matching function data c, $Vl(\lambda)$ and kl (l=1 to R) be the basis function V and expansion coefficient K of the spectral reflectance of the object 1, respectively.

$$f(\lambda) = \sum_{l=1}^{R} k_l v_l(\lambda)$$

$$f_{il}'(\lambda) = c_i(\lambda) v_l(\lambda) \quad (i=1{\sim}3, l=1{\sim}R)$$

$$q'_{M(i-1)+j}(\lambda) = h_i^{(2)}(\lambda) q_j(\lambda) \quad (i=1{\sim}3, j=1{\sim}M)$$

$$f^{(l)} = (f'_{1l}, f'_{2l}, f'_{3l})^t$$

$$f_{il}' = (f_1 l'(\lambda_1), f_2 l'(\lambda_2), \ldots, f_3 l'(\lambda_N))$$

$$q' = (q_1', q_2', \ldots, q_3 M')_t$$

$$q_i' = (q_i'(\lambda_1), q_i'(\lambda_2), \ldots, q_i'(\lambda_N))$$

$M^{(1)}qc$ that minimizes $$E^{(1)}_{qc} = (f_1' - M^t_{qc} q')^t (f_1' - M^t_{qc} q')$$

is calculated by $$M^{(1)}_{qc} = f_1' q'^t (q' q'^t)^{-1}$$

The tristimulus values $C^{(1)}$ of the basis functions are obtained by $$C^{(l)} = M^{(l)}_{qc} P$$

$$P = (P_1, P_2, \ldots, P_3 M)^t$$

$$C^{(l)} = (X^{(l)}, Y^{(l)}, Z^{(l)})^t$$

The tristimulus value estimation matrix Mqc is given by $$M_{qc} = (C^{(1)} C^{(2)}, \ldots, C^{(R)})$$

More specifically, the tristimulus value estimation matrix Mqc is obtained as the linear sum of the tristimulus values $C^{(1)}$ of the basis functions, which is obtained by multiplying the color chip sensing data P by a matrix $M^{(1)}qc$ obtained from the relationship between the product of a plurality of basis functions $v1(\lambda)$ for the spectral reflectance $f(\lambda)$ of the object 1 and the color matching functions $ci(\lambda)$ and the product of the spectral reflectance $qj(\lambda)$ of the color chip 6 and the spectral sensitivity $hi^{(2)}(\lambda)$ of the digital camera 8 as an input device for sensing the color chip 6.

The calculated tristimulus value estimation matrix Mqc is input to the tristimulus value matrix conversion unit 74 and converted into the tristimulus values C by $$C = M_{qc} K$$

As is apparent from equation (18), when $E^{(l)}qc$ (l=1 to R) is 0, accurate tristimulus values C can be obtained by the above equations for an arbitrary observation illumination light spectrum Eo.

The tristimulus values C calculated by the tristimulus value matrix conversion unit 74 are input to the color image signal calculation unit 9 shown in FIG. 5, converted into RGB data as output color image signals, and input to a CRT monitor 10, as in the first embodiment. The arrangement of the color image signal calculation unit 9 is the same as in the first embodiment, and a detailed description thereof will be omitted.

As described above, according to the second embodiment, by using the color chip 6 having a known spectral reflectance and the digital camera 8 as an input device for sensing the color chip 6, which has a known spectral sensitivity, the spectral reflectance image data F can be converted into XYZ image data as the tristimulus values C under the observation illumination light by the tristimulus value calculation unit 15 without using any measurement instrument such as a spectrophotometer, as in the first embodiment.

If the product of the plurality of basis functions $v1(\lambda)$ of the spectral reflectance $f(\lambda)$ of the object 1 and the color matching functions $ci(\lambda)$ can be expanded by the product of the spectral reflectance $qj(\lambda)$ of the color chip 6 and the spectral sensitivity $hi^{(2)}(\lambda)$ of the digital camera 8 as an input device for sensing the color chip 6, the spectral reflectance image data F can be highly accurately converted into the XYZ image data as the tristimulus values C under the observation illumination light.

In this embodiment, more accurate conversion is enabled by changing the color chip 6 to be used and the characteristics of the second digital camera 8 as an input device for sensing the color chip 6 in accordance with the basis functions V of the spectral reflectances $f(\lambda)$ of the object 1.

According to this embodiment, since all of the spectral reflectances $f(\lambda)$ of the object 1 are expanded by the basis functions V, the conversion accuracy for the actual object 1 can be obtained in advance by evaluating the conversion accuracy for the basis function V in advance.

In this embodiment, the tristimulus values $C^{(1)}$ under the observation illumination light corresponding to the basis function V of the spectral reflectance $f(\lambda)$ of the object 1 can be calculated in advance. For this reason, after the expansion coefficient K corresponding to the spectral reflectance $f(\lambda)$ is input, the tristimulus values C under the observation illumination light corresponding to the spectral reflectance $f(\lambda)$ can be calculated at a high speed as the linear sum of the tristimulus values $C^{(1)}$ of the basis functions.

OTHER EMBODIMENTS

The present invention is not limited to the above embodiments, and various changes and modifications can be made.

(1) In the first and second embodiments, the spectral reflectance $f(\lambda)$ of the object 1 is calculated from image data obtained by sensing the object 1 with the digital camera 3. However, the present invention is not limited to this, and the spectral reflectance image data of an arbitrary object can be used.

(2) In the first and second embodiments, the CRT monitor 10 has been exemplified as the color image output means. However, this can be replaced with an image output device such as a display of another scheme or a printer.

(3) In the first and second embodiments, the digital camera 8 with three RGB channels is used as the input device for sensing the color chip 6. However, for the camera for sensing the color chip 6, an arbitrary spectral sensitivity characteristic and an arbitrary number of channels can be selected.

(4) In the present invention, a system may be constructed in which the sensing side for sensing the object 1 is located in a remote site separated from the observation side for observing an object image displayed on the CRT monitor 10, and image data is transmitted.

In this case, the spectral reflectance calculation unit 4 or 14, tristimulus value calculation unit 5 or 15, and color image signal calculation unit 9 can be provided either on the sensing side or on the observation side.

In this case, the processing described in the above embodiments can be realized by storing data necessary for processing by the spectral reflectance calculation unit 4 or 14, tristimulus value calculation unit 5 or 15, and color image signal calculation unit 9 in the respective units or acquiring the data by transmission.

(5) In the first embodiment, the tristimulus values C under the observation illumination light of the object 1 are obtained assuming that the product of the spectral reflectance $f(\lambda)$ of the object 1 and the color matching functions $ci(\lambda)$ can be expanded by combining the spectral reflectance $qj(\lambda)$ of the color chip 6 and the spectral sensitivity $hi^{(2)}(\lambda)$ of the digital camera 8 for sensing the color chip 6. Even when the spectral reflectance $f(\lambda)$ of the object 1 can be expanded by a value obtained by dividing the product of the spectral reflectance $qj(\lambda)$ of the color chip 6 and the spectral sensitivity $hi^{(2)}(\lambda)$ of the digital camera 8 by the color matching functions $ci(\lambda)$, the tristimulus values C under the observation illumination light of the object can be obtained.

In this case, when the spectral reflectance $f(\lambda)$ of the object 1 is multiplied by a matrix, the spectral reflectance can be converted into the tristimulus values C under the observation illumination light. By coupling a matrix used to calculate the spectral reflectance $f(\lambda)$ from the object image signal obtained by sensing the object 1 with the digital camera 3, the object image signal can be directly converted into the tristimulus values C under the observation illumination light.

The present invention is not limited to the method of calculating the tristimulus values under the observation illumination light from the spectral reflectance of the object and also incorporates a method of directly calculating the tristimulus values under the observation illumination light from the signal value obtained by an input device such as a camera.

(6) As a modification to the second embodiment, the tristimulus values C under the observation illumination light can be directly calculated from the object image signal by coupling a matrix for calculating the expansion coefficient K of the basis function V of the spectral reflectance $f(\lambda)$ of the object 1 from the object image signal obtained by sensing the object to a matrix for calculating the tristimulus values C under the observation illumination light of the object 1 from the expansion coefficient. The present invention also incorporates such a substantially equivalent processing method.

As has been described above, according to the present invention, a color reproduction system having a color image processing apparatus for easily converting the spectral reflectance image of an object into a tristimulus image under observation illumination light without using any measurement instrument such as a spectrophotometer can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color reproduction system comprising:

tristimulus value calculation means for calculating tristimulus values under observation illumination light corresponding to a spectral reflectance of an object which is sensed under sensing illumination light, said tristimulus value calculation means calculating the tristimulus values using spectral reflectance data of a color chip formed from a plurality of unit color chips, color chip sensing data obtained by sensing the color chip with an input device under the observation illumination light, spectral sensitivity data of said input device, and color matching function data;

means for calculating an output color image signal based on the calculated tristimulus values; and means for outputting a color image based on the output color image signal.

2. A system according to claim 1, wherein said tristimulus value calculation means multiplies the color chip sensing data by a matrix obtained from a relationship between a product of the spectral reflectance of the object and color matching functions and a product of the spectral reflectance data of the color chip and the spectral sensitivity of said input device, thereby calculating the tristimulus values.

3. A system according to claim 1, wherein said tristimulus value calculation means obtains the tristimulus values as a linear sum of basis function tristimulus values obtained by multiplying the color chip sensing data by a matrix obtained from a relationship between a product of a plurality of basis functions of the spectral reflectance of the object and color matching functions and a product of the spectral reflectance data of the color chip and the spectral sensitivity of said input device.

4. A system according to claim 1, wherein said input device comprises a digital camera.

5. A system according to claim 1, wherein the color chip has a plurality of unit color chips having independent spectral reflectances and arrayed in a matrix.

6. A system according to claim 1, wherein said means for outputting the color image comprises a monitor, and said means for outputting the output color image calculates the output color image on the basis of characteristics of said monitor.

7. A color reproduction system comprising:

first image sensing means for sensing an object under sensing illumination light;

means for calculating a spectral reflectance of image data of the object sensed by said first image sensing means on the basis of spectral sensitivity data of said first image sensing means, spectrum data of the sensing illumination light, statistic data of a spectral reflectance of the object, and outputting spectral reflectance image data corresponding to the calculated spectral reflectance;

second image sensing means for sensing a color chip under observation illumination light;

means for calculating tristimulus values of the object under the observation illumination light on the basis of the output spectral reflectance image data, color chip image data of the color chip sensed by said second image sensing means, spectral sensitivity data of said second image sensing means, color chip spectral reflectance data representing a spectral reflectance distribution of the color chip, and color matching function data;

means for calculating an output color image signal on the basis of the calculated tristimulus values; and means for outputting a color image on the basis of the output color image signal.

8. A system according to claim 7, wherein each of said first image sensing means and said second image sensing means comprises a digital camera.

9. A system according to claim 7, wherein the color chip has a plurality of unit color chips having independent spectral reflectances and arrayed in a matrix.

10. A system according to claim 7, wherein said means for outputting the color image comprises a monitor, and said means for outputting the output color image calculates the output color image on the basis of characteristics of said monitor.

11. A color reproduction system comprising:

first image sensing means for sensing an object under sensing illumination light;

means for outputting expansion coefficient data which is represented as a linear sum of basis functions of a spectral reflectance of the object on the basis of spectral sensitivity data of said first image sensing means, spectrum data of the sensing illumination light and statistic data of a spectral reflectance of the object;

second image sensing means for sensing a color chip under observation illumination light;

means for calculating tristimulus values of the object under the observation illumination light on the basis of the output expansion coefficient data, color chip image data of the color chip sensed by said second image sensing means, spectral sensitivity data of said second image sensing means, color chip spectral reflectance data representing a spectral reflectance distribution of the color chip, and color matching function data;

means for calculating an output color image signal on the basis of the calculated tristimulus values; and means for outputting a color image on the basis of the output color image signal.

12. A system according to claim 11, wherein each of said first image sensing means and said second image sensing means comprises a digital camera.

13. A system according to claim 11, wherein the color chip has a plurality of unit color chips having independent spectral reflectances and arrayed in a matrix.

14. A system according to claim 11, wherein said means for outputting the color image comprises a monitor, and said means for outputting the output color image calculates the output color image on the basis of characteristics of said monitor.

* * * * *